United States Patent [19]

Evans et al.

[11] Patent Number: 4,781,909

[45] Date of Patent: Nov. 1, 1988

[54] PROCESS FOR REMOVING BORON FROM SULFURIC ACID

[75] Inventors: Francis E. Evans; Joel P. Guptill, both of Hamburg, N.Y.

[73] Assignee: Allied-Signal Inc., Morris Township, Morris County, N.J.

[21] Appl. No.: 865,216

[22] Filed: May 19, 1986

Related U.S. Application Data

[63] Continuation-in-part of Ser. No. 653,162, Sep. 24, 1984, abandoned.

[51] Int. Cl.$^4$ .................. C01B 17/90; C01B 35/06
[52] U.S. Cl. .................................. 423/531; 423/293
[58] Field of Search .................. 423/293, 531, 522

[56] References Cited

U.S. PATENT DOCUMENTS

| | | |
|---|---|---|
| 2,381,027 | 8/1945 | Baldeschwieler et al. .......... 423/293 |
| 2,416,133 | 2/1947 | Young et al. .......... 423/293 |
| 4,265,871 | 5/1981 | Felice, Jr. et al. .......... 423/431 |
| 4,520,006 | 5/1985 | Laviron et al. .......... 423/293 |

FOREIGN PATENT DOCUMENTS

| | | | |
|---|---|---|---|
| 232560 | 2/1961 | Australia .................. 423/293 |
| 522875 | 3/1956 | Canada .................. 423/293 |
| 522874 | 3/1956 | Canada .................. 423/293 |
| 2027389 | 12/1971 | Fed. Rep. of Germany ...... 423/293 |
| 59-50018 | 3/1984 | Japan .................. 423/293 |
| 1216065 | 2/1969 | United Kingdom .......... 423/293 |

*Primary Examiner*—Gary P. Straub
*Attorney, Agent, or Firm*—Harold N. Wells; Jay P. Friedenson

[57] ABSTRACT

Sulfuric acid contaminated with boron and fluoride values such as the waste acid of a boron trifluoride process is purified by contacting the contaminated acid with an inert gas to desorb boron trifluoride, and the inert gas is stripped by contacting with an absorbing liquid including concentrated sulfuric acid. Hydrogen fluoride and/or fluorosulfuric acid are added to contaminated sulfuric acid as agents to spring non-volatile boron value. In addition, the water content of the contaminated acid is adjusted within a narrow concentration range, to improve the efficiency of both the stripping and the absorption operations. The absorption of boron trifluoride into the absorbing sulfuric acid is improved when it contains boric acid. Preferably the contaminated sulfuric acid to be purified is one portion of the waste liquid and the absorbing liquid is another portion of the waste liquid of a boron trifluoride manufacturing process. Boric acid is added to the absorbing liquid, then boron trifluoride is stripped from the inert gas and absorbed into the absorbing liquid. The absorbing liquid along with stripped boron trifluoride is recycled to a boron trifluoride manufacturing process. The inert gas can be recycled to the desorbing step.

6 Claims, No Drawings

PROCESS FOR REMOVING BORON FROM SULFURIC ACID

This is a continuation-in-part application of application Ser. No. 653,162 filed on Sept. 24, 1984, now abandoned.

BACKGROUND OF THE INVENTION

1. Field of the Invention

This invention relates generally to a process for removing boron from sulfuric acid. More particularly, this invention relates to a process for removal of boron from sulfuric acid by the addition of a fluoride in combination with water to increase the volatility of boron as boron trifluoride. Reduction of the boron content by vaporization of boron trifluoride improves the quality of the sulfuric acid for use in certain areas as for example the fertilizer industry.

2. Prior Art

Boron trifluoride is readily produced by the reaction of boric acid dissolved in concentrated sulfuric acid with fluorosulfuric acid which is also known as fluosulfonic acid. The reaction is frequently represented by the following equation:

$$B(OH)_3 + 3FSO_3H \rightarrow BF_3 + 3H_2SO_4 \qquad \text{I.}$$

Equation I is convenient for describing the overall process and for determining material balances but is inaccurate in describing the actual reaction which takes place. Boric acid, $B(OH)_3$, does not exist as such when it is dissolved in concentrated sulfuric acid. Instead it is converted to tetra(hydrogensulfato)boric acid, $HB(HSO_4)_4$, by the reaction shown as Equation II:

$$B(OH)_3 + 4H_2SO_4 \rightarrow HB(HSO_4)_4 + 3H_2O \qquad \text{II.}$$

The mixture of tetra(hydrogensulfato)boric acid and water, both of which remain dissolved in the concentrated sulfuric acid solvent, are then reacted with fluorosulfuric acid, according to Equation III:

$$HB(HSO_4)_4 + 3H_2O + 3FSO_3H \rightarrow BF_3 + 7H_2SO_4 \qquad \text{III.}$$

It will be noted that Equation I is the net result of adding Equation II and Equation III together. The process is described in detail in U.S. Pat. No. 2,416,133. While the process is comparatively simple to operate and anhydrous boron trifluoride is easily recovered, it suffers from some disadvantages. The chief disadvantage of the process is the generation of about 4.3 pounds of by-product sulfuric acid, which is contaminated with boron, for every pound of boron trifluoride produced. This contamination lessens the usefulness of the sulfuric acid and makes marketing more difficult. For example, boron is phytotoxic to many plants and, therefore, its presence in fertilizers above certain concentrations is undesirable. This limits the use of the sulfuric acid in the production of phosphate fertilizers which otherwise would be a natural outlet for the sulfuric acid. Also, the loss of boron values with the by-product acid imposes an economic burden on the process. Consequently, it is highly desirable to remove boron from the by-product sulfuric acid as recoverable boron trifluoride.

Several processes have been proposed for purification of boron-containing sulfuric acid. Among the suggestions for purifying contaminated sulfuric acid is a process described in U.K. Pat. No. 1,216,065. In this process nitrogen is passed through the contaminated sulfuric acid or the acid is contacted in a washing tower with air in countercurrent flow at elevated temperatures with absorption of the expelled boron trifluoride in water or formation of hydroxyfluoboric acid. This process suffers from a number of inherent disadvantages. For example, such a process is capable of recovering only that portion of the boron present as boron trifluoride. Furthermore, the process recovers the boron trifluoride in the form of hydroxyfluoboric acid which is unsuitable for conversion back to boron trifluoride. The resultant aqueous solution of hydroxyfluoboric acid represents a disposal problem rather than a valuable commodity. Moreover, substantially complete removal of boron trifluoride from inert gases (such as air) is not easily achieved with water as the absorbing liquid. The gas outflow has a fog of boron trifluoride in the form of a hydrate or other unknown species, representing a serious pollution problem.

Processes have been proposed to obviate the disadvantages of processes of the type described in UK Pat. No. 1,216,065. Examples of these processes are the processes described in U.S. Pat. No. 4,265,871 and German Pat. No. 3,017,156. These patents describe a process for purification of boron-containing sulfuric acid which consists of adding a quantity of fluorosulfuric acid in excess of the stoichiometric amount required to convert all of the tetra (hydrogensulfato) boric acid into boron trifluoride. The volatile boron trifluoride is then stripped from the acid at an elevated temperature using an inert carrier gas. A further embodiment of these patents is the recovery of the stripped boron trifluoride by absorbing it in a solvent consisting of boric acid dissolved in sulfuric acid. The absorbed boron trifluoride may then be recycled by feeding the solution to the boron trifluoride generator. The stripping process is based on the fundamental approach of shifting Reaction III towards the production of boron trifluoride at the expense of boric acid by increasing the concentration of fluorosulfuric acid relative to tetra(hydrogensulfato)boric acid. The approach is successful but has some disadvantages. For example, large amounts of fluorosulfuric acid are initially consumed in order to raise the vapor pressure of boron trifluoride sufficiently and, if the excess fluorosulfuric acid is to be recovered, higher temperatures, higher flow rates of stripping gas and/or longer stripping cycles are required.

SUMMARY OF THE INVENTION

The present invention is an improvement in a process of the type in which sulfuric acid contaminated with boron values is purified by adding one or more fluorine containing species selected from the group consisting of fluorosulfuric acid, hydrogen fluoride, or hydrofluoric acid (an aqueous solution of hydrogen fluoride) to said contaminated sulfuric acid, contacting the mixture of the contaminated sulfuric acid and the one or more fluorine containing species with an inert gas to remove boron trifluoride, and then contacting the inert gas containing boron trifluoride with an absorbing liquid to strip the inert gas, the improvement comprising adding water to or removing water from said contaminated sulfuric acid prior to contacting same with the inert gas. The improvement in the process is based on the discovery that control of the water content within a narrow range, either by its addition or removal, along with fluorosulfuric acid, will improve the efficiency of the boron trifluoride stripping operation.

The prior art depended only on an excess of fluorosulfuric acid, at a particular temperature and/or stripping gas flow rate, to volatilize boron trifluoride. The present invention includes adding fluorosulfuric acid and water in a quantity at, or only slightly above that required to convert all the dissolved boron to boron trifluoride. This minimizes fluorosulfuric acid consumption while permitting reduction of the boron content to about 10 ppm (mg/kg) or less. It also allows an adjustment in the volume of stripping gas consumed which can be used to optimize the performance of the stripping gas scrubber. At the same time, the residual amount of fluorosulfuric acid remaining in solution may be set within desired limits. This can be of great significance if marketing of the acid is constrained by specifications setting a maximum fluoride content. In addition, the invention is considered particularly advantageous from a practical and useful standpoint because it reduce the size of the equipment and/or the retention time for the reaction and this is economically advantageous.

DETAILED DESCRIPTION OF THE INVENTION

The process of this invention consists of two essential steps. In the first step of the process an "effective amount of water" and an "effective amount of one or more fluorine compounds" selected from the group consisting of fluorosulfuric acid, hydrogen fluoride or hydrofluoric acid is added to contaminated sulfuric acid containing boron, such as the sulfuric acid waste stream of a boron trifluoride manufacturing process. Unlike the prior art, the exact concentration of acid in this stream is critical to the present invention. This acid is generally of a concentration of at least about 97%, and advantageously at least about 98.5%, and peferably between 99 and 100% measured by total acid; the balance being water. Briefly, this standard measurement of sulfuric acid concentration is determined by titrating the contaminated acid with standard base such as one molar sodium hydroxide to a pH of 7 and expressing the moles of base consumed by the contaminated acid as a percentage of the moles of base consumed by an equivalent weight of 100% sulfuric acid. This value is taken directly for acid with only minor amounts of boric acid, as below about 0.5%.

When the acid concentration is less than 99 to 100%, or even when 97% or less, the balance being mostly water, the acid concentration can be adjusted so that it falls within the preferred range of the invention by techniques well known in the art. For acid concentrations less than 100%, the balance being most water, the acid concentration can be increased by adding $SO_3$ or oleum ($SO_3$ dissolved in $H_2SO_4$) The $SO_3$ and water react to form additional $H_2SO_4$. The water content is reduced and the $H_2SO_4$ concentration is increased. For example, 100 grams of acid having a concentration of 97% $H_2SO_4$ contains about 3 grams of water. Addition of 8.8 grams of $SO_3$ will convert 2 grams of water to $H_2SO_4$ and the new mixture will then be about 99% $H_2SO_4$.

The boron contamination may take the form of tetra(-hydrogensulfato)boric acid, boron trifluoride and intermediates therebetween such as $HB(HSO_4)_3F$ and $HB(HSO_4)_2F_2$. It may also take other forms as for example $BF_3.H_2SO_4$ and $HBF_4$. Fluoride may be, but is not necessarily, present in the contaminated sulfuric acid stream as well. Other contaminants may also be present, as for example contaminate which are contributed by the various raw materials of a boron trifluoride manufacturing process (sulfur trioxide, hydrogen fluoride, boric acid and/or boron trioxide). Representative contaminants include other halides (chloride and bromide), heavy metals, nitrate and other anions and iron. The contaminants have no adverse effect upon the purification of the contaminated sulfuric acid stream with regard to boron and, if present, fluoride by the present process. Representative waste streams from a boron trifluoride process include 0.05 to 0.5 percent total boron, 0.5 to 3 percent total fluoride, 95 to 100 percent sulfuric acid as $H_2SO_4$, 0 to 2 percent boron (expressed as boric acid), 0.2 to 2 percent boron trifluoride, 1 to 1000 ppm chloride, 1 to 500 ppm heavy metals, 1 to 100 ppm nitrate and 10 to 1000 ppm iron, all by weight. The waste stream may also contain very minor proportions of organics.

As used herein, "an effective amount of fluorine compounds" is an amount of such compounds which is effective to aid in the conversion of the dissolved boron to volatile boron trifluoride to any extent. In general, the amount of such compounds added to the contaminated acid is usually at least about two times the number of moles of boron present in the acid. The upper amount of such compound added is not critical and is dictated primarily by economics and/or the fluoride content of the stripped acid. In the preferred embodiments of the invention, the mole ratio of added fluorine compound to boron present in the acid is from about 2.4 to about 5.0, and in the particularly preferred embodiments is from about 2.9 to about 4.0. Amongst these particularly preferred embodiments, most preferred are those in which the mole ratio of added fluorine compound to boron in the acid is from about 3.0 to about 3.1. Although it is recognized that the boron values in the contaminated acid may take forms such as $HB(HSO_4)_3F$ and $HB(HSO_4)_2F_2$ it is convenient to partition the boron content into a tetra(hydrogensulfato)boric acid component and a boron trifluoride component. Thus, each three moles of $HB(HSO_4)_3F$ can be thought of as two moles of $HB(HSO_4)_4$ and one mole of $BF_3$.

The tetra(hydrogensulfato)boric acid moles present in the waste acid stream from a boron trifluoride manufacturing process may be estimated by assuming that all of the fluoride is in the form of boron trifluoride and that all of the boron is either in the form of boron trifluoride or in the form of tetra(hydrogensulfato)boric acid. Thus the moles of tetra(hydrogensulfato)boric acid will be:

$$(B/10.81) - (F/3 \times 19.00),$$

where B is the grams of boron and F is the grams of fluoride. If R is the desired mole ratio of fluorosulfuric acid to tetra(hydrogensuflato)boric acid sought, then the amount of fluorosulfuric acid to be added becomes:

$$(R) \times (100.07) \times [(B/10.81) - (F/57)] = (R) \times (9.26B - 1.76F).$$

If it is desired to supplant fluorosulfuric acid with hydrogen fluoride, 100.07 which is the molecular weight of fluorosulfuric, is replaced in the equation by 20.01, which is the molecular weight of hydrogen fluoride. Then the amount of hydrogen fluoride to be added becomes:

$$(R) \times (20.01) \times [(B/10.81) - (F/57)] = (R) \times (1.85B - 0.351F).$$

If hydrofluoric acid is used, then the moles of hydrogen fluoride required can be calculated using the above formula and an amount of hydrofluoric acid containing an equivalent amount of hydrogen fluoride can be used.

The above formulas are independent of the units chosen so that, when B and F are indentically measured in, for example, kilograms per hour, pounds per minute, parts per million or any other relevant unit, the resultant fluorosulfuric acid, hydrogen fluoride or hydrofluoric acid quantities come out in the same units. Once these quantities are determined on an exact or estimated basis, fluorosulfuric acid, hydrogen fluoride or hydrofluoric acid are added to the contaminated acid in quantities sufficient to convert substantially all of the tetra(hydrogensulfato)boric acid component (and intermediate forms) to boron trifluoride based upon the above partitioning, these stoichiometric amounts will be about three moles of fluorosulfuric acid or hydrogen fluoride per mole of tetra(hydrogensulfato)boric acid component. Thus, a molar ratio of at least 3.0, preferably between about 3.0 and about 4.0, and more preferably about 3.1, is used.

In actual operations, the effect of the fluorosulfuric acid or hydrogen fluoride concentration (such as temperature change in the absorber column, the partial pressure of boron trifluoride leaving the absorber column or the boron level of the liquid leaving the desorber column) may be measured, and the fluorosulfuric acid or hydrogen fluoride level adjusted accordingly. This is normally suggested instead of estimating the boric acid content of the contaminated acid.

The fluorosulfuric acid and, hydrogen fluoride can be used as the fluorine containing compound. Hydrogen fluoride may be substituted for fluorosulfuric acid on a mole per mole basis although it must be recognized that each mole of hydrogen fluoride will react with one mole of sulfuric acid to form one mole of water as well as one mole of fluorosulfuric acid. Also the water balance must include the water added with hydrogen fluoride if an aqueous solution of hydrogen fluoride, e.g. hydrofluoric acid, is employed.

In addition to the fluorine containing compound an "effective amount of water" is added to the contaminated acid. Generally water is added as such. However, mixing of water with concentrated sulfuric acid produces a highly exothermic reaction. This can be readily contained on a small scale, as in the laboratory, or on a large scale if appropriate heat exchange equipment is available Alternatively, the water may be added in the form of a solution of water in sulfuric acid: 5% water (95% sulfuric acid) to about 10% water (90% sulfuric acid). Addition of 90 to 95% sulfuric acid to more concentrated sulfuric acid, on the order of 100%, is in fact slightly endothermic in reaction. Since the quantity of water in terms of weight is comparatively small, use of the sulfuric acid is not particularly burdensome. Also, 90 to 95% sulfuric acid is a common article of commerce and is available at locations where sulfuric acid is produced. If, for example, it is desired to add 1 gram of water using a 90% sulfuric acid solution (the balance being mostly water) then 10 grams of the 90% solution is added.

The amount of water to be added to the acid is calculated in a manner similar to that used to calculate the amount of fluorine containing compound to be added to the acid. The moles of boron present in the acid will be:

$$B/10.81$$

where B is the grams of boron present in the acid. If R is the desired mole ratio of water to boron, and if the concentration of $H_2SO_4$ is 100%, then the weight of water to be added becomes:

$$(R \times 18.015) \times (B/10.81)$$

When the concentration of the $H_2SO_4$ is less than 100% and the balance is mostly water, then the amount of water added must be adjusted so that the final concentration of water in the acid falls within the preferred range. Then the weight of the water to be added will be:

$$(R \times 18.015) \times (B/10.81) - W$$

where W is the weight of water initially present in the acid. If the result of the calculation is "zero", then no weight of water need be added. If the result is positive, then that weight of water is added. If the result if negative, then the water content needs to be reduced and/or the $H_2SO_4$ content increased. This last adjustment may be done as described previously by adding the appropriate amount of $SO_3$, for example. By using the above equation, carrying out the calculation, and taking the indicated action, the water content will be adjusted to the desired ratio of water to boron.

The above formulas are independent of the units chosen so that, when B and W are identically measured in, for example, kilograms per hour, pounds per minute, parts per million or any other relevant unit, the resultant quantity of water comes out in the same units.

In general, "an effective amount of water" as used herein is an amount which is sufficient to enhance efficacy of the fluorine containing compounds in removal of boron from the contaminated acid to any extent. In the preferred embodiments of the invention, the mole ratio of water (added to the 100% acid) to boron containing compound present in the acid is from about 0.01 to about 5.0, and in the particularly preferred embodiments the mole ratio is from about 0.1 to about 4.0. Amongst these particularly preferred embodiments, most preferred are those embodiments in which the mole ratio of water added to the acid to boron containing compound present the acid is from about 1.0 to about 2.0. When the $H_2SO_4$ concentration is less than 100%, the water content is adjusted to these ratios.

The temperature and pressure employed during the first step of the invention are not critical and can vary widely. For example, temperatures of from about 20° C. to about 250° C. can be employed, with preferred temperatures being from about 60° C. to about 150° C. Similarly, this step can be carried out at subatmospheric, atmospheric or super-atmospheric pressure. In the preferred embodiments, the step is carried out at autogenous pressure.

In the second step, after increasing or reducing the water content and addition of one or more fluorine containing compounds, the mixture of water, one or more fluorine compounds and the contaminated acid is contacted with one or more "inert gases" to remove boron trifluoride from the system. As used herein "inert gases" are any gases which are nonreactive under the contacting conditions. For example, the inert gas contacting the contaminated sulfuric acid stream may be air, nitrogen, other noble gas, or a combination thereof. Preferably, because of ready availability, the inert gas is nitrogen or air. Contacting of the inert gas and contaminated sulfuric acid may be conducted at atmospheric pressure, somewhat above atmospheric pressure (such as about 900 millimeters or mercury absolute of 120kPa), or at any vacuum condition below atmospheric pressure that are conveniently obtained. Preferably this step is conducted at between about 30 and 800 millimeters of mercury absolute pressure (about 4 to about 107 kPa). The temperature of this step is also not critical by itself, with temperatures as low as about 60° C. or somewhat below up to about 250° C. being contemplated, with the upper limit on temperature depending upon the resulting rate of corrosion of materials of construction and the vapor pressure of sulfuric acid. Preferably, the temperature is between about 60° C. and about 150° C. Higher temperatures enable the contact time or column length to be shortened. Particularly in continuous systems, the relative amounts or flows of contaminated sulfuric acid and of inert gas can be within broad ranges, obtained by routine testing to achieve the desired purity, and depending upon the particular contacting apparatus, contamination levels, temperature and pressure conditions employed. Suitable apparatus for the desorber step include packed and/or tray columns connected to a blower or vacuum pump.

The process of the present invention can reduce boron levels in a contaminated sulfuric acid stream such as the waste stream from a boron trifluoride manufacturing process from levels such as about 3000 to about 5000 ppm boron to about 10 ppm of boron or less, all by weight. These lower amounts represent levels at which the acid is now directly suitable for many uses. Furthermore, the contaminated sulfuric acid from a boron trifluoride process is conventionally blended with industrial or higher grades of sulfuric acid to bring the boron (especially) and fluoride levels below levels accepted for agricultural grade sulfuric acid or the like. When the contaminated sulfuric acid is purified by the present process, a much smaller ratio of industrial grade sulfuric acid to contaminated sulfuric acid can be used for this blending, or no industrial grade sulfuric acid need be blended at all. For example, if the contaminated sulfuric acid contains about 3000 ppm boron then about 29 times as much industrial grade sulfuric acid must be used to bring the boron level down to the 100 ppm specification set for sulfuric acid used to prepare fertilizers. If, however, the contaminated acid is purified by the present process to lower the boron concentration to about 100 ppm or less, no industrial grade sulfuric acid need be used for each part of purified contaminated sulfuric acid to achieve the 100 ppm specification.

In an optional step, the boron trifluoride (and frequently also fluorosulfuric acid) can be recovered from the inert gas for recycle. Rather than hydrolyzing the boron trifluoride, the present process involves recovering the boron trifluoride in usable form in sulfuric acid preferably of a concentration of at least about 95% by weight, more preferably at least about 98% by weight and most preferably between about 98% by weight and 101% by weight. So long as the absorbing sulfuric acid is at least about 95% by weight "concentration" it can be used as a feed or recycle stream to a boron trifluoride manufacturing process. Strength above about 98% by weight is preferred in order to reduce corrosion.

Since the solubility and rate of dissolving boron trifluoride from inert gas in concentrate sulfuric acid (over about 90% by weight) by itself is quite low, the absorbing liquid contains a mixture of tetra(hydrogensulfato)boric acid and sulfuric acid. With tetra(hydrogensulfato)boric acid present, both the rate of absorption and capacity of the liquid for boron trifluoride increase dramatically.

The sulfuric acid "concentration" of the mixture of sulfuric acid and dissolved boric acid used to determine the above preferred numbers is not the result of titration alone. The acidity determined by titration is a measure of both dissolved boric acid (one titratable hydrogen per molecule) and sulfuric acid (two titratable hydrogens). Accordingly, to determine if a given solution has more or less than a standard "concentration", one may measure the boron and fluoride levels in the test solution, add boric acid and hydrogen fluoride to a reference sulfuric acid of the desired standard concentration (for example 95% by weight to 98% by weight) and measure the acidity of the two solutions by titration with the same aqueous base. If the test material requires more base than the reference, it had a sulfuric acid "concentration" as intended herein of over the standard value.

When so used, the boron trifluoride recovered from the inert gas (and any fluorosulfuric acid also absorbed therefrom) can be effectively recycled back so as to increase the amount of boron trifluoride recoverable from the manufacturing process. It should be appreciated that any absorbing sulfuric acid stream may be so used to absorb boron trifluoride from the inert gas, whether or not the contaminated sulfuric acid stream was the waste stream from a boron trifluoride manufacturing process. Preferably, however, both the contaminated sulfuric acid stream which is purified by the first or desorbing step and the absorbing stream which is employed in the second step are portions of the waste acid stream of a boron trifluoride manufacturing process.

The conditions of the absorbing step are not specifically critical, with pressure of atmospheric pressure or somewhat below (down to about 700 mm of mercury or about 93 kPa) or higher being suitable. Preferred pressures are between about 1 and 5 atmospheres (about 101.3 to about 506.6 kPa). The temperature is not especially critical, with temperatures between ambient (about 20° C.) and about 100° C. being preferred and with temperatures between about 20° C. and about 50° C. being more preferred. In general, lower temperature and higher pressures result in an increased absorption rate, while lower temperatures also tend to increase the viscosity of the absorbing mixture of sulfuric and boric acids.

The absorbing sulfuric acid may contain various impurities, but preferably contains as significant impurities only boron as tetra(hydrogensulfato)boric acid or boron trifluoride, and fluoride as boron trifluoride, fluorosulfuric acid and hydrogen fluoride. When limited to these impurities and having a sulfuric acid "concentration" of at least about 95%, as determined above, the absorbing sulfuric acid stream is suitable after absorption for recycling to a boron trifluoride manufacturing process. Preferably the "concentration" is at least about 98%, more preferably between about 98% and about 101%.

Preferably the absorbing sulfuric acid stream contains dissolved boric acid at a concentration between about 5 and about 30% and more preferably between about 15 and about 25%, all by weight. These concentrations may be obtained by adding boric acid in solid form to a portion of the waste acid stream of a boron trifluoride manufacturing process. It has been found that boric acid significantly increases the rate and capacity of absorption of boron trifluoride into concentrated sulfuric acid. Concentrations below about 5% are somewhat limited in their effect upon boron trifluoride absorbing rate and are hence less preferred. Concentrations above about 25% by weight and especially above about 30% by weight are less preferred because of a resultant increase in the viscosity of the boric-sulfuric acid solution, reducing the ease and degree of mixing between the absorbing boric-acid content of the absorbing liquid are together limited by the workable viscosity of the absorbing apparatus chosen. In general, absorbing liquids with viscosities as high as about 800 centipoise (about 800 mPa.s) may be used, but liquids with viscosities below about 500 mPa.s are more preferred. Since concentrated sulfuric acid at normal absorbing conditions will have a viscosity of about 10 to about 50 mPa.s, the preferred viscosity range for the absorbing liquid is about 40 to about 500 mPa.s and more preferred range is about 80 to about 150 mPa.s.

Apparatus suitable for the absorbing step include a packed and/or tray absorbing tower. The relative flow rates or amounts of inert gas and absorbing sulfuric acid, depending upon the apparatus chose, concentration of boron trifluoride in the inert gas, the composition of the absorbing sulfuric acid, the temperature and pressure, can be easily determined within broad ranges by routine testing and measurement. Preferably, contact times and other conditions are sufficient to reduce the boron level in the inert gas below about 10 ppm, more preferably below about 5 ppm and most preferably below about 1 ppm. This higher boron level represents a substantially complete boron trifluoride recovery for purposes of a system in which the inert gas is then recycled to a first step of the process. The more stringent boron trifluoride levels of about 5 and 1 ppm represent levels whereat the inert gas may be vented after the absorbing step. Since maximum acceptable ambient boron levels vary depending upon the conditions and upon controlling environmental regulations and laws, the absorbing step is preferably conducted in a manner that will, a a minimum, achieve these necessary limits. Because of the potential hazards of atmospheric boron trifluoride vapors, it is generally preferred that the inert gas be recycled rather than vented. In general, the recovery of boron rather than the recovery of fluoride should be monitored. Fluoride, as boron trifluoride, is normally removed from the inert gas stream to reasonable levels such as about 52, 26 and 5 ppm, respectively, whenever the above boron levels are achieved since fluorosulfuric acid and hydrogen fluoride will normally be removed from the inert gas before the boron trifluoride reaches the low levels specified above.

This invention will be further described by the following specific examples. It will be understood, however, that although these examples may describe in detail certain preferred operating conditions of the invention, they are given primarily for purposes of illustration and the invention in its broader aspects is not limited thereto.

EXAMPLE I

A series of experiments were carried out to demonstrate the effectiveness of the process of this invention in permitting the reduction of boron in sulfuric acid to a level of about 10 ppm (10 mg/kg) or less at the operating temperature range of 60° C. to 150° C. In these experiments, three solutions were prepared as follows. To 1600 grams of 100% sulfuric acid is added 22.20 g of boric acid to provide a base solution containing 0.24% boron. To these solutions are added 143.72 grams of fluorosulfuric acid and 6.468 grams of water to provide solutions in which the mole ratio of fluorosulfuric acid to boron is 4.0, and the mole ratio of water to boron is 1.0. These additions changed the boron concentrations to about 0.22%. The molar ratios of fluorosulfuric acid and water to boron are based on this value.

The solutions are then heated to the operating temperature of from about 60° C. to about 150° C. At this point, designated as zero time, a sample is taken and analyzed for boron. Sparging of the agitated solution with the inert stripping gas is then begun and is continued for a period of time ranging from one to six hours. The gas is nitrogen, and the flow rate at room temperature (about 20° C.) and atmospheric pressure is 200 cm$^3$ per minute. Samples are taken at convenient time intervals during the one or six hour long runs. The results are set forth in the following Table I.

TABLE I

EFFECT OF FSO$_3$H AND H$_2$O ON BORON REMOVAL FROM H$_2$SO$_4$

|  | A | B | C |
|---|---|---|---|
| MOLAR RATIO FSO$_3$H/BORON | 4.0 | 4.0 | 4.0 |
| MOLAR RATIO H$_2$O/BORON | 1.0 | 1.0 | 1.0 |
| OPERATING TEMPERATURE (°C.) | 60 | 105 | 150 |
| TIME (hours) | BORON REMAINING EXPRESSED AS PPM | | |
| 0.0 | 800 | 740 | 120 |
| 1.0 | — | 10 | 7 |
| 6.0 | 12 | 9 | 7 |

Example I demonstrates that the combination of fluorosulfuric acid and water is quite effective in permitting the reduction of boron in the acid to a level of about 10 ppm (10 mg/kg) or less over the operating temperature range of 60° to 150° C. when carried out according to the process described. In each instance, the solutions originally contained 2200 ppm (0.22%) boron. The differences in the boron concentrations shown at "zero" time at each temperature and their variation from 2200 ppm are the consequence of the volatility of boron trifluoride and the supersaturation of the solutions with respect to boron trifluoride at the reactant concentrations. Incidentally, the decline in boron concentration as a function of increasing temperature at "zero" time indicates that boron will be removed more rapidly at higher temperatures.

EXAMPLE II

A series of experiments were carried out to demonstrate the increased effectiveness of using a combination of fluorosulfuric and water in reducing boron content as compared to fluorosulfuric acid alone. For these experiments two compositions were formulated by addition of fluorosulfuric acid, and a combination of fluorosulfuric acid and water to the base solution of Example I. The composition of these test compositions are set forth in the following Table II.

TABLE II

| Test Solution | ppm of Boron | Molar Ratio FSO₃H/Boron | Molar Ratio H₂O/Boron |
|---|---|---|---|
| A | 2200 | 4.0 | 0.0 |
| B | 2200 | 4.0 | 1.0 |

Test Solutions A and B were heated to a temperature of 105° C. At this point, designated zero time, a sample is taken and analyzed for boron. Sparging of the agitated solutions with the inert stripping gas is then begun and is continued for a period of time ranging from one to six hours. The sparging gas used is nitrogen and the flow rate at room temperature (about 20° C.) and atmospheric pressure is 300 cm³ per minute. Samples are taken at convenient time intervals during the one or six hour long runs. The results are set forth in the following Table III.

TABLE III

| | BORON REMAINING EXPRESSED AS PPM | |
|---|---|---|
| TIME (hours) | A | B |
| 0.0 | 1600 | 740 |
| 1.0 | 68 | 10 |
| 6.0 | 2 | 9 |

Example II demonstrates that an excess of fluorosulfuric alone is effective in reducing the boron content to about 10 ppm or less but that an excess of fluorosulfuric in combination with an excess of water is more efficient in achieving this goal. The benefit is the reduction of the boron content to 740 ppm at "zero" time when water is added while it is only reduced to 1600 ppm at "zero" time when no water is added. In addition, the boron content is reduced to 10 ppm within one hour when water is added while the boron content has only been reduced to 68 ppm when water is not added.

It should be noted that the concentration of 2 ppm (A) and 9 ppm (B) might lead one to infer that system A is superior to system B after 6 hours elapses. However, when the concentration of boron reaches about 10 ppm or less, the accuracy of the analytical method deteriorates. Although the results of the analyses are accurately reported, the values of 2 and 9 ppm are essentially the same from a practical point of view. Thus, the example demonstrates that while the prior art and the present invention can be equally effective after a prolonged period of stripping, the process of the present invention is more effective in a short period of stripping time and the rate of boron removed is faster.

EXAMPLES III to X

Employing the procedure of Examples I and II various aliquots of the base solution were prepared and various amounts of water and fluorosulfuric acid, are added. The resulting test solutions were sparged over a period of up to 6.00 hours and the samples taken at convenient time intervals and analyzed for boron content. The operating parameters and results are set forth in the following Table IV.

TABLE IV

EFFECT OF EXCESS FLUOSULFURIC ACID AND WATER ON REMOVAL ON BORON FROM SULFURIC ACID

| Experimental Parameters | EXAMPLES | | | | | | | |
|---|---|---|---|---|---|---|---|---|
| | III | IV | V | VI | VII | VIII | IX | X |
| Operating Temperature (°C.) | 105 | 105 | 105 | 105 | 105 | 105 | 105 | 105 |
| Mole Ratio FSO₃H/Boron | 2.4 | 3.0 | 3.1 | 3.5 | 3.5 | 4.0 | 4.0 | 4.0 |
| Excess FSO₃H (%) | 0.0 | 0.0 | 0.2 | 1.0 | 1.0 | 2.1 | 2.1 | 2.1 |
| Mole Ratio H₂O/Boron | 0.0 | 1.0 | 4.0 | 1.0 | 2.0 | 0.0 | 1.0 | 8.1 |
| Excess H₂O (%) | 0.0 | 0.4 | 1.5 | 0.4 | 0.7 | 0.0 | 0.4 | 3.0 |

| | EXAMPLES REMAINING BORON EXPRESSED AS PPM | | | | | | | |
|---|---|---|---|---|---|---|---|---|
| TIME (hours) | III | IV | V | VI | VII | VIII | IX | X |
| 0.00 | 810 | 500 | 1200 | 920 | 660 | 1600 | 740 | 1900 |
| 0.17 | — | — | — | 20 | 70 | — | — | — |
| 0.33 | — | — | — | 430 | <10 | — | — | — |
| 0.50 | 710 | 230 | 420 | 41 | <10 | 64 | — | 580 |
| 0.75 | — | — | — | 30 | <10 | 68 | 10 | 250 |
| 1.00 | 580 | 100 | 110 | 24 | <10 | 68 | 10 | 250 |
| 1.50 | 580 | 20 | <10 | — | — | 27 | — | 47 |
| 2.00 | 500 | 20 | <10 | — | — | 57 | — | 22 |
| 3.00 | — | 20 | — | — | — | 12 | — | 12 |
| 4.00 | — | 5 | — | — | — | 3 | — | 12 |
| 5.00 | — | — | — | — | — | 2 | — | 9 |
| 6.00 | 500 | 7 | <10 | — | — | 2 | 9 | 2 |

In example III, the molar ratio of fluorosulfuric acid to boron was 2.4, and no additional water was used. This is 80% of the stoichiometric amount of fluorosulfuric acid required. In this example, 77% of the original boron content was removed. This example is presented in recognition of the prior art. A less than stoichiometric quantity of FSO₃H will remove an equivalent amount of boron over an extended period of time.

Example IV demonstrates that the boron content can be reduced to less than 10 ppm, even though 4 hours are required, by the addition of the stoichiometric amount of fluorosulfuric acid if excess water is also added. This procedure would be useful if there is a limitation on the fluoride content of the stripped sulfuric acid or if it is desired to minimize the condumption of fluorosulfuric acid. Example IV may be dompared with Example VIII. In Example IV only 3 moles of fluorosulfuric acid per mole of boron is added but 1.0 mole of water per mole of boron is also added. In Example VIII, 4.0 moles of fluorosulfuric acid per mole of boron is added; or 1.0 mole over the stoichiometric amount. Example VIII is typical of the prior art in which a substantial excessof fluorosulfuric is used. However, both examples IV and VIII are about equally effective after 4 to 6 hours. This demonstrates the efficacy of the presence of a small amount of water.

Example V demonstrates that a small excess of fluorosulfuric in the presence of an appreciable excess of water is more effective after 1.5 hours or at least as effective as prior art Example VIII at 6.0 hours. Example V also demonstrates that the residual fluoride content can be kept low and the fluorosulfuric acid consumption can be reduced to less than the prior art but the boron content is reduced to less than 10 ppm within 1.5 hours.

Examples VI and VII demonstrate that at a fixed amount of fluorosulfuric acid, in appreciable excess over stoichiometric, an increase in the concentration of water will within limits, improve the efficiency of boron removal. In Example VII, the boron content is reduced to less than 10 ppm in 0.33 hours. Although the analytical results for Example VI are somewhat inconsistant, Example VII shows the superiority of 2.0 moles of water per mole of boron over 1.0 mole or water per mole of boron in 5 out of 6 samples analyzed. Also, even though less fluorosulfuric acid is added than in Example VIII, both VI and VII show a more rapid removal of boron than VIII.

In Example X, the procedure was modified with respect to the source of fluoride. A 52% by weight aqueous hydrogen fluoride solution was added instead of fluorosulfuric acid. Hydrogen fluoride reacts in concentrated sulfuric acid according to the following reaction:

$$HF + H_2SO_4 \rightarrow FSO_3H + H_2O \qquad IV.$$

Both the water from the aqueous solution and the water formed in Reaction IV are used as the source of excess water. Example X demonstrates that commercial 52% hydrogen fluoride can be used instead of fluorosulfuric acid and that a substantial amount of excess water will still permit the boron content to be reduced to 10 ppm or less. However, removal is not as rapid as in Example IX. Also, the results are poor compared with prior art Example VIII up to 1.5 hours and only equal to those of Example VIII in a 3 to 6 hour period. This demonstrates that there is an optimum water content and that when this content is exceeded, performance over prior art is not improved.

Examples VIII, IX and X distinctly show the improvement of the invention. In the period from "zero" to 1.0 hour, the process of Example IX is markedly superior to either Examples VIII or X even when the same amount of excess fluorosulfuric acid is added. The rate of boron removal is much faster. All three examples converge to essentially the same values after 3 hours and remain there until 6 hours when the runs were terminated. The important aspect is that in Example IX the 10 ppm boron concentration level is attained four times as rapidly as in the other two examples. In Example VIII, no water has been added, in Example IX, 1 mole of water per mole of water has been added, and in Example X, 8.1 moles of water per mold of boron has been added. Thus, it must be concluded that there is an optimum amount of water between the extremes of "zero" and 8.1 moles of water per mole of boron which increases the rate of boron removal from sulfuric acic containing a fluoride source to conver the boron to $BF_3$.

It will be understood that various changes may be made within the ranges and limitations disclosed herein and therefore do not intend to limit ourselves except as set forth in the claims which follow.

What is claimed is:

1. In a process of the type in which sulfuric acid contaminated with non-volatile boron values is purified through conversion of the relatively non-volatile boron values to boron trifluoride by adding fluorosulfuric acid to the contaminated sulfuric acid, in an amount such that the molar ratio of contained fluoride to boron is at least 3 and thereafter contacting the resulting mixtures of said contaminated sulfuric acid and said fluorosulfuric acid with one or more inert gases, which desorb and sweep out the voltatile boron trifluoride from the contaminated sulfuric acid, the improvement comprising maintaining a molar ratio of contained fluoride to boron greater than 3.1/1 to 4/1 and adjusting the water content of the sulfuric acid such that the mole ratio of excess fluoride above the stoichiometric value of 3 to water in the acid is greater than about 0.25/1 and up to about 1/1 prior to contacting said acid with the said inert gas.

2. The process of claim 1 wherein said non-volatile boron values are in the form of tetra(hydrogen-sulfato) boric acid $((HB(HSO_4)_4)$.

3. The process of claim 1 wherein said contaminated sulfuric acid is at least a portion of the waste acid of boron trifluoride synthesis process.

4. The process of claim 1 wherein said non-volatile boron values comprise 0.05–0.5 weight percent of the sulfuric acid to be purified.

5. The process of claim 1 where the molar ratio of excess fluorine to water is about 1/1.

6. The process of claim 1 wherein said molar ratio of contained fluoride to boron is about 3.5–4 to 1.

* * * * *